UNITED STATES PATENT OFFICE.

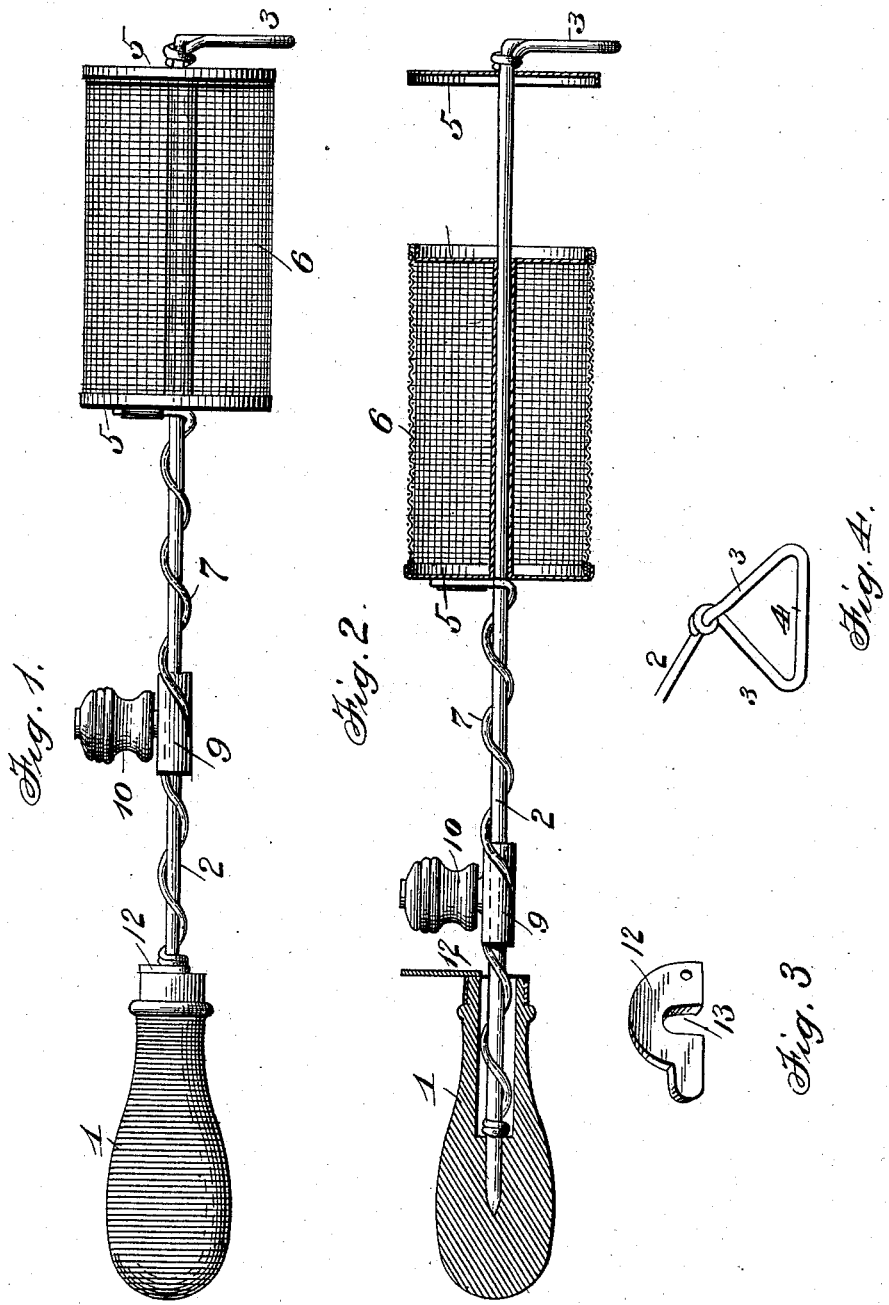

CLARENCE G. LAMBERT, OF BLOOMINGTON, ILLINOIS, ASSIGNOR OF ONE-HALF TO OSCAR S. VINTON, OF SAME PLACE.

CORN-POPPER.

SPECIFICATION forming part of Letters Patent No. 580,698, dated April 13, 1897.

Application filed September 25, 1896. Serial No. 606,921. (No model.)

*To all whom it may concern:*

Be it known that I, CLARENCE G. LAMBERT, a citizen of the United States, and a resident of Bloomington, in the county of McLean and State of Illinois, have invented certain new and useful Improvements in Corn-Poppers; and I do hereby declare that the following is a full, clear, and exact description of the invention, which will enable others skilled in the art to which it appertains to make and use the same, reference being had to the accompanying drawings, which form a part of this specification.

My invention relates to corn-poppers; and its object is to provide an improved implement for popping corn, which shall possess important advantages with respect to efficiency in use.

The invention consists, essentially, in the novel construction and combination of parts hereinafter fully described and claimed.

In the accompanying drawings, Figure 1 is an elevation of a corn-popper constructed in accordance with my invention. Fig. 2 is a longitudinal section of the same, showing the corn-receptacle open, so as to allow it to be filled and emptied. Fig. 3 is a detail view showing the pivoted slotted catch. Fig. 4 is a detail view showing the manner of forming the support.

In the said drawings the reference-numeral 1 designates a hollow handle, to which is secured a rod 2, having its outer end bent downwardly, horizontally, and upwardly and its extremity twisted around the same, forming two inclined arms 3 3 and a horizontal arm 4, which serve as supports for the device. Journaled on this rod is a rotatable corn-receptacle which is also movable up and down on said rod. This receptacle consists of two end disks or heads 5 and a cylindrical casing 6, of wire-gauze. The outer one of these heads is removable, while the other or inner one is secured to the casing. Secured to said inner head is a wire 7, which is wound spirally around said rod and extending to the handle and its end coiled around the rod at that point. Mounted on said rod is a slide 9, formed with a spiral groove with which the spiral wire engages. It is also provided with a handle 10. Pivoted to the inner end of said handle is a catch or stop 12, formed with an open slot 13.

The operation is as follows: To open the corn-receptacle to fill it with corn to be popped, the catch 12 is turned to one side, so that the spiral rod can be pushed down into the hollow handle, drawing the corn-receptacle away from the outer end of the rod, so that the outer head can be removed. After the corn has been placed in the receptacle the latter is pushed outward until the removable head comes in contact with the support at the outer end of the rod, which will hold the head in its closed position. The pivoted catch is then pushed inward or closed, so that the inner end of the spiral will abut against the same. By now reciprocating the slide back and forth the corn-receptacle will be alternately rotated in opposite directions, thus causing the corn therein to be agitated or tumbled about, so that it will all be properly popped.

Having thus fully described my invention, what I claim is—

1. In a corn-popper, the combination with the hollow handle, the rod secured thereto, the rotatable and movable corn-receptacle and the removable head, of the spiral rod secured to said receptacle, the slotted and pivoted catch and the slide having a spiral groove; substantially as described.

2. In a corn-popper the combination with the hollow handle, the rod secured thereto, having its end bent downwardly, horizontally, and upwardly forming a support and the rotatable and movable corn-receptacle having a removable head, of the spiral rod secured to said receptacle, the slotted and pivoted catch and the slide having an annular groove; substantially as described.

In testimony that I claim the foregoing as my own I have hereunto affixed my signature in presence of two witnesses.

CLARENCE G. LAMBERT.

Witnesses:
  JNO. G. WELCH,
  FRED M. BARBER.